United States Patent
Zerwekh et al.

(10) Patent No.: US 7,437,027 B2
(45) Date of Patent: Oct. 14, 2008

(54) ISOLATED SENSOR HOUSING

(75) Inventors: Paul Samuel Zerwekh, Shawsville, VA (US); Brad Willis Davis, Charlottesville, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/764,415

(22) Filed: Jun. 18, 2007

(65) Prior Publication Data
US 2007/0292071 A1    Dec. 20, 2007

Related U.S. Application Data

(60) Provisional application No. 60/805,132, filed on Jun. 19, 2006.

(51) Int. Cl.
*G02B 6/00* (2006.01)

(52) U.S. Cl. .......................................................... 385/12

(58) Field of Classification Search ....................... None
See application file for complete search history.

(56) References Cited

U.S. PATENT DOCUMENTS

| | | | | |
|---|---|---|---|---|
| 5,582,064 | A * | 12/1996 | Kluth ......................... | 73/1.57 |
| 6,439,055 | B1 * | 8/2002 | Maron et al. .................. | 73/705 |
| 6,442,304 | B1 * | 8/2002 | Crawley et al. ............... | 385/12 |
| 7,322,247 | B2 * | 1/2008 | Boyd et al. ................. | 73/729.1 |

* cited by examiner

*Primary Examiner*—Michelle R. Connelly-Cushwa
*Assistant Examiner*—Chris Chu
(74) *Attorney, Agent, or Firm*—The H.T. Than Law Group

(57) ABSTRACT

Disclosed is a sensor housing having a flexible sensor tube containing a transmission fluid and having sealed ends, and an optical sensor connected to an optical fiber. The optical sensor is adapted to measure a pressure of a fluid and this pressure is communicated to the flexible sensor tube, so that the pressure is transferred by the transmission fluid to the optical sensor. The sensor can measure temperature and/or pressure, and the sensor can be located remote from the sensor housing or within the sensor housing.

19 Claims, 3 Drawing Sheets

ISOLATED SENSOR HOUSING

CROSS-REFERENCE TO RELATED APPLICATIONS

This application claims priority under 35 U.S.C. 119(e) to Provisional Application No. 60/805,132, filed on Jun. 19, 2006.

BACKGROUND

The invention relates generally to optical sensor technologies. In particular, the invention relates to optical sensors isolated from environmental elements in relatively small diameter housing.

Available electronic sensors measure a variety of values, such as, pH, color, temperature, or pressure, to name a few. For systems that require a string of electronic sensors over a long distance, e.g. twenty to thirty kilometers or longer, powering the electronic sensors becomes difficult. Conventionally, the powering of electronic sensors requires running electrical wire from a power source to each of the electronic sensors. Powering electronic sensors electrically has been unreliable in the petroleum and gas industry. For example, electric wires spanning long distances are subject to a significant amount of interference and noise, thereby reducing the accuracy of the electronic sensors.

Optical fibers have become the communication medium of choice for long distance communication due to their excellent light transmission characteristics over long distances and the ease of fabrication of lengths of many kilometers. Further, the light being transmitted can interrogate the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as, pressure or temperature. A string of optical fibers within a fiber optic system is used to communicate information from wells being drilled, as well as from completed wells. The optical fiber could be deployed with single point pressure-temperature fiber optic sensor. Also, a series of weakly reflecting fiber Bragg gratings (FBGs) may be written into a length of optical fiber or a single point Fabry-Perot sensor may be spliced into a length of optical fiber. An optical signal is transmitted down the fiber, which is reflected and/or scattered back to a receiver and analyzed to characterize external parameters along the length of the optical fiber. Using this information, downhole measurements including but not limited to temperature, pressure, and chemical environment may be obtained.

Known optical sensor geometries include Fabry-Perot, Bragg-grating, Mach-Zehnder, Michelson and Sagnac, among others. If all of the sensing occurs within the optical fiber, the optical sensor is an intrinsic fiber; therefore, the fiber acts as both a transmission medium and a sensing element. If the fiber does not act as a sensing element but merely acts as a transmission medium, the optical sensor is classified as an extrinsic sensor. In an extrinsic optical sensor, the optical fiber transmits the light source to an external medium, for example air, where the light is modulated to provide the desired sensing or detection. Optical sensors are also classified by the optical principle which they operate. Interferometric optical sensors utilize interference patterns between source light beams and reflected beams. Intensity based sensors measure the light lost from the optical fiber.

One type of optical sensor is the extrinsic Fabry-Perot interferometer ("EFPI"). An EFPI utilizes two reflective surfaces and the difference or shift between a reference beam and a reflected beam directed through an optical fiber. This phase shift is used to determine or calculate the desired physical or environmental characteristic.

However, when conventional optical fibers such as germanium-doped silica fibers are exposed to the intense heat, pressure, and chemical-rich environment of an oil well attenuation losses increase. This increase in the loss of optical strength of the signal is due, in part, to the diffusion of hydrogen into the glass structure. Hydrogen atoms bond to any open or weak bonds in the glass structure, such as to certain germanium atoms in the vicinity of germanium-oxygen deficient centers or to form SiOH and/or GeOH. For germanium doped fibers, the attenuation increases rapidly with increases in temperature. As temperatures in a typical oil or gas well generally range from slightly less than surface temperature near the surface to between about 90 to 250 degrees Centigrade (C.), conventional germanium-doped optical fibers are generally not sufficiently stable for prolonged use at depth in a well. While coating germanium-doped silica fibers with carbon or similar molecularly dense materials is an effective way to reduce hydrogen diffusion into the glass at lower temperatures, such as below 120 degrees C., the effectiveness of the carbon coating diminishes rapidly as the ambient temperature increases.

One known way to protect sensor fiber from the harsh conditions of the well is to physically isolate the fiber from the environmental conditions of the well, which is described in WIPO PCT Publication WO 2005/024365 A2, which is incorporated herein by reference in its entirety. The fiber of the sensor is typically placed within a protective housing such as a hollow metal cylindrical housing. The interior chamber of the housing includes a compressible clean fluid which is capable of translating the pressure and/or temperature of the well conditions. At the interface of the housing and the well conditions is a deformable diaphragm which forms one wall of the interior chamber of the housing. The diaphragm is deflected by the external pressure, thereby varying the volume of the interior chamber and compressing the clean fluid therewithin. As such, the external pressure is translated to the optical sensor even though the optical sensor is not exposed to the harsh environmental conditions within the well. Similarly, the heat transfer properties of the diaphragm and the clean fluid may be selected to allow the optical sensor to detect the downhole temperature. In this manner, the optical sensor is protected from the chemicals and impurities within the well while still obtaining useful pressure and temperature readings.

One drawback to the currently available isolated optical sensors as described above is that the diameter of the housing is relatively large to provide the diaphragm with sufficient surface area to move freely to translate the ambient pressure to the isolated sensor. Consequently, isolated sensors are not available for many situations in tight spaces, a situation that often arises in downhole and other pumping applications. Therefore, a need exists for isolated optical sensors that are capable of being made smaller than those available in the art.

SUMMARY OF THE INVENTION

The present invention is directed to a sensor housing comprising a flexible sensor tube, which contains a transmission fluid and has sealed ends, and an optical sensor connected to an optical fiber. The optical sensor is adapted to measure a pressure of a fluid, when this pressure is communicated to the flexible sensor tube so that the pressure is transferred by the transmission fluid to the optical sensor. The optical sensor also measures temperature, and can be located within the flexible sensor tube or remote therefrom. The pressure of the fluid can be communicated to the flexible sensor tube through a pressure port or an opening, and the flexible sensor tube can be at least partially covered by a porous, permeable element.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
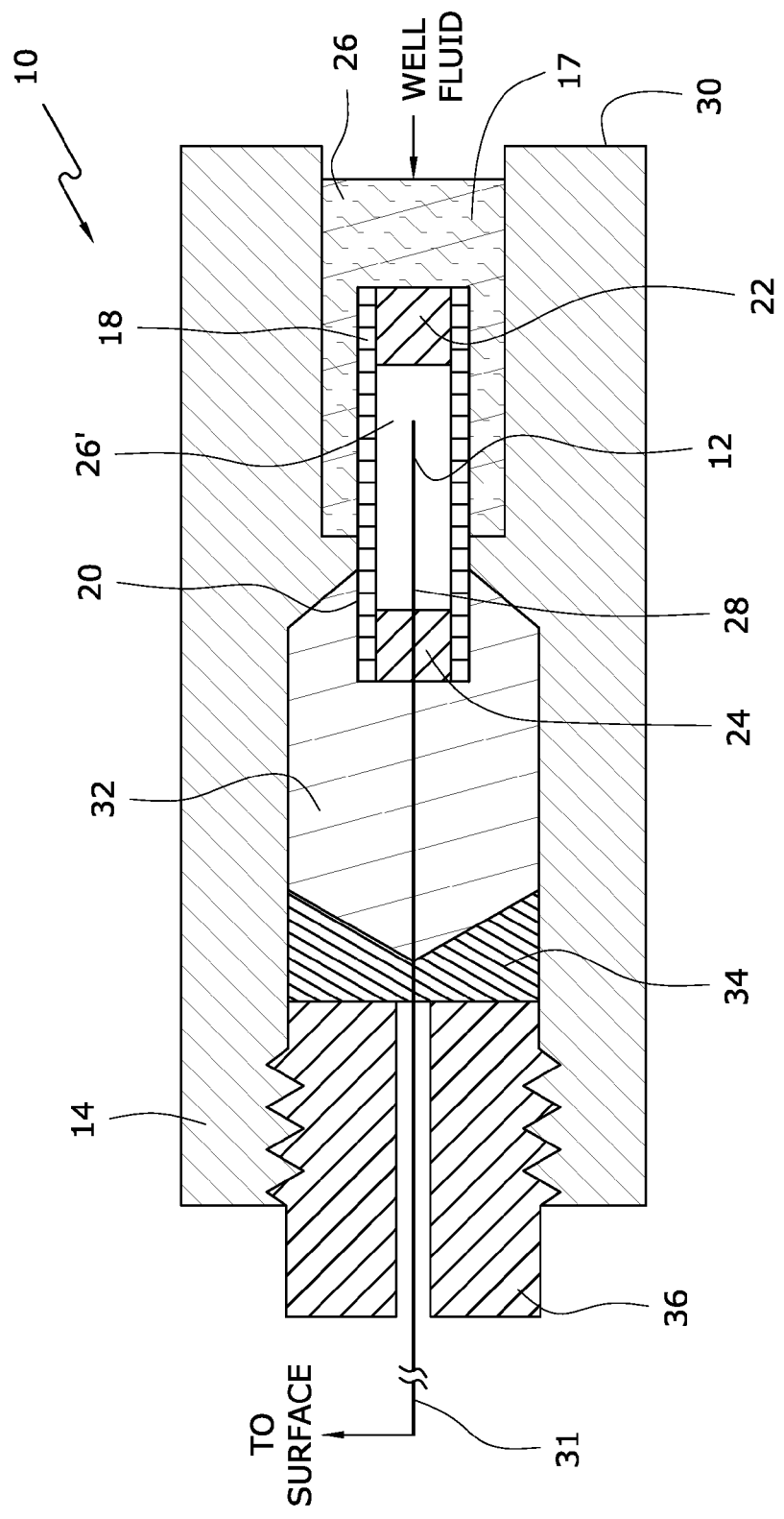
FIG. 1 is a schematic cross-sectional drawing of an isolation housing and sensor according to the present invention.

As illustrated in the accompanying drawings and discussed in detail below, an embodiment of the present invention is directed to an isolation housing 10 for use with a sensor 12. As shown in FIG. 1, sensor 12 may be any type of sensor known in the art, but is preferably an optical sensor capable of detecting and relaying information regarding ambient temperature and pressure, such as those discussed above. Suitable optical sensors are also disclosed in WIPO PCT Publication WO 2005/024365 A2, previously incorporated herein by reference. Sensor 12 is connected to an optical fiber 28, such as an optical fiber or electrical wire.

Isolation housing 10 includes an outer tube 14. Outer tube 14 provides a general holding structure into which the other components of isolation housing 10 are then fitted. Outer tube 14 is a relatively thick-walled hollow cylinder preferably made from a rigid material that can withstand prolonged exposure to the pressure and heat downhole. For example, outer tube 14 may be made from stainless steel, titanium, or the like.

Sensor 12 is further disposed within sensor tube 18, which is sealed on both end by plugs 22 and 24. Sensor tube 18 is disposed within porous, permeable filter element 17. Outer tube 14 structurally protects sensor 12, sensor tube 18 and porous filter element 17 from the surrounding environment. A distal end 30 of outer tube 14 is exposed to the surrounding environment, e.g., the pressure and temperature of the fluid in a well bore, so that porous filter element 17 is exposed to the conditions intended to be monitored. Element 17 is preferably made from a porous, permeable rigid material, such as ceramic or metal, to provide additional structural support for the exposed end of sensor tube 18. The pressure of the environment to be measured is hydraulically transmitted through porous, permeable filter element 17 to act on the outer surface of sensor tube 18, which behaves similar to a membrane and is compressed to transfer the pressure to sensor 12, when the interior of sensor tube is filled with a gas or a liquid. The temperature to be measured is transferred to sensor 12 through any known heat transfer mechanisms, i.e., conduction, convection and/or radiation, through outer housing 14, filter element 17 and sensor tube 18.

Since sensor tube 18 is responsive to pressure through its lateral surface, it occupies less space than a conventional diaphragm having substantially the same surface exposed to pressure. Hence, sensor tube 18 allows optical sensors to be deployed in tighter spaces, which is advantageous for oil and gas, or space applications.

Preferably, porous filter element 17 is saturated with a clean fluid 26, such as water, clean oil, or the like. When exposed to caustic or corrosive environmental conditions, clean fluid 26 provides a clean buffer, which can translate pressure to sensor tube 18, so that no environmental fluid need come into contact with sensor tube 18. Preferably the porosity of filter element 17 and the viscosity of clean fluid are selected such that the surface tension of the clean fluid within the bores of filter element 17 retains the clean fluid within filter element 17. Preferably, the interior of sensor tube 18 is filled with clean fluid 26'. Clean fluid 26' acts a transmission fluid to communicate pressure from flexible sensor tube 18 to sensor 12.

Flexible tube 18 is preferably made from a durable polymer, such as polyimide, but also may be made from metals, other polymers, or other materials capable of flexing in response to pressure, but not being degraded by the anticipated temperature and pressure conditions. Flexible tube 18 also preferably includes a coating 20, such as gold, to prevent corrosion or degradation of flexible tube. Gases, such as water vapor, hydrogen, and other gases commonly found in well environments, seep through polymers such as polyimide, so flexible tube 18 can be penetrated by these gases over time. A metal coating provides a more hermetic barrier by preventing these gases to penetrate the polyimide of flexible tube 18.

Plugs 22, 24 close and seal the ends of flexible sensor tube 18. Plugs 22, 24 are preferably made from a durable material, such as polyetheretherketone (PEEK). Additional materials appropriate for use as plugs 22, 24 include any number of inert, non-compressible materials, such as stainless steel, high strength austenitic nickel-chromium-iron alloys such as Inconel®, high strength nickel-copper alloys such as Monel, ceramics, and silicon nitride. At least one of plugs 22, 24 is configured to allow optical fiber 28 to be passed into flexible tube 18. Optical fiber 28 is preferably encased within a protective outer covering 31 until optical fiber 28 enters sensor tube 18. For example, protective outer covering 31 may be a flexible coating made from a polymeric or rubber material, a rigid tube made from a metal or plastic material, or a semiflexible tube made from hinged sections of rigid tubing. Optical fiber 28 also passes through sealing element 32 and into sensor tube 18 and connects to sensor 12. This allows optical fiber 28 to pass out of isolation housing 10 to travel to the surface instrumentation, either directly or by connecting to a trunk line (not shown).

Sealing element 32 prevents corrosive fluid that may pass through filter element 17 from exiting the opposite end of isolation housing 10 and potentially traveling up optical fiber 28 to damage surface equipment. Sealing element 32 is preferably a compression seal made from a durable, flexible material such as PEEK, silicone, glass-filled PTFE, PFA, graphite-filled polyamide, and soft metals such as annealed aluminum. To load sealing element 32 for an effective seal, a compression plug 36, such as a threaded screw that attached to outer tube 14, presses against sealing element 32, either directly or through a washer 34.

In operation in an oil and gas well, isolation housing 10 is positioned such that filter element 17 is exposed to well conditions to be measured. Well fluid encounters and acts on clean fluid 26 within filter element 17, such the well fluid exerts a pressure force on clean fluid 26. Isolation housing 10 and all the components contained therein including sensor 12 are heated to the temperature of the well fluid. Also, clean fluid 26 translates the pressure of the well fluid to flexible sensor tube 18 of sensor 12. In response to the pressure change, flexible tube 18 is compressed and its length is lengthened.

Figure 2:
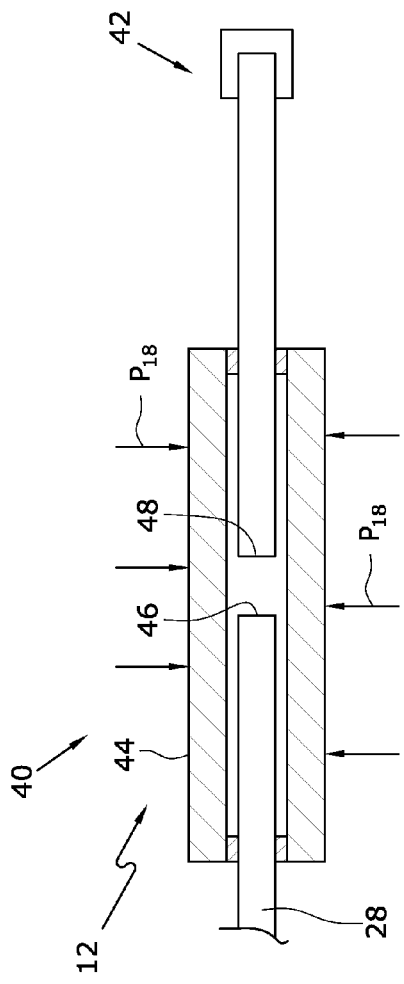
FIG. 2 is an enlarged cross-sectional schematic view of an exemplary optical sensor for use in the housing shown in FIG. 1.
Figure 4:
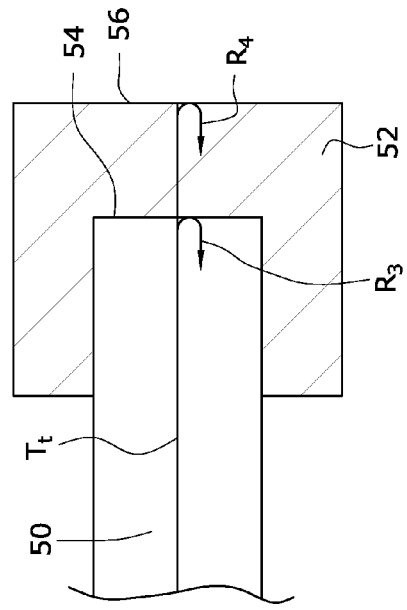
FIG. 4 is an enlarged cross-sectional schematic view of the temperature sensing region of the optical sensor of FIG. 2.
Figure 3:
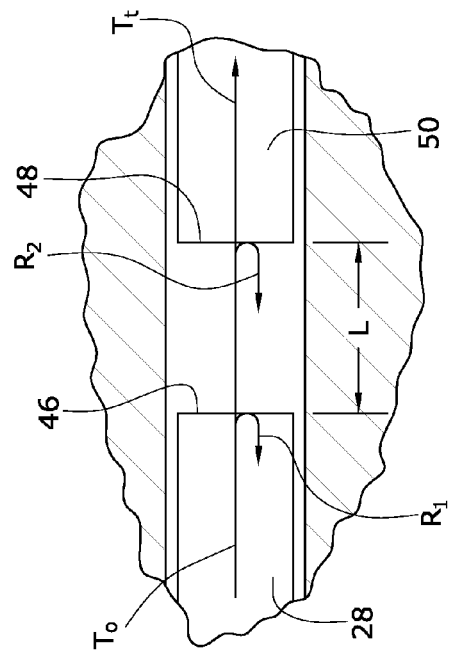
FIG. 3 is an enlarged cross-sectional schematic view of the pressure sensing region of the optical sensor of FIG. 2.

The temperature can be measured by a temperature sensing portion of sensor 12. The pressure can be measured an extrinsic Fabry-Perot interferometer (EFPI) or an intrinsic Fabry-Perot interferometer (IFPI). Suitable temperature sensors and EFPI/IFPI are fully described in WIPO PCT Publication WO 2005/024365 A2, previously incorporated herein by reference. A sample EFPI/temperature sensor is illustrated in FIG. 2-4. As shown, sensor 12 comprises EFPI pressure sensing portion 40 and temperature sensing portion 42. Pressure sensor 40 comprises two reflecting surfaces 46 and 48 disposed inside housing 44. Surfaces 46 and 48 are spaced length L apart. As pressure $P_{18}$ within sensor tube 18 increases due to well bore pressure transmitted through filter element 17, $P_{18}$ compresses housing 44, as shown in FIG. 2, and change length L, thereby changing the phase between first reflected light $R_1$ and second reflected light $R_2$ of original incident light $T_0$, as shown in FIG. 3. This phase change is indicative of the pressure to be measured.

The light transmitted through second surface 48 or $T_t$ continues down another optical fiber 50 connecting EFPI sensor 40 to temperature sensor 42. Temperature sensor 42 comprises a material 52 that changes its refractive index as a function of temperature. Suitable temperature sensitive materials include silicon, silicon carbide, sapphire, tantalum oxide, etc. Transmitted light $T_t$ produces reflected light $R_3$ at surface 54 and $R_4$ at surface 56. Temperature changes experienced by temperature sensitive material 52 cause another phase change that is indicative of the temperature to be measured.

$R_1$ and $R_2$ form an interferometric signal and $R_3$ and $R_4$ form another interferometric signal. Examples of interferometric signals are disclosed in U.S. Pat. No. 6,671,055 B1, which is incorporated herein by reference in its entirety. These reflected signals are transmitted to the surface instrumentation by optical fiber 28.

Alternatively, pressure can be measured by Bragg gratings sensors. In one example, a Bragg sensor is embedded into sensor tube 18, or adhered to a surface of sensor tube 18. As sensor tube is compressed, the Bragg sensor is strained thereby shifting the response frequency of light reflected from the Bragg sensor, as known in the art. The shift in frequency is indicative of the pressure to be measured.

Figure 5:
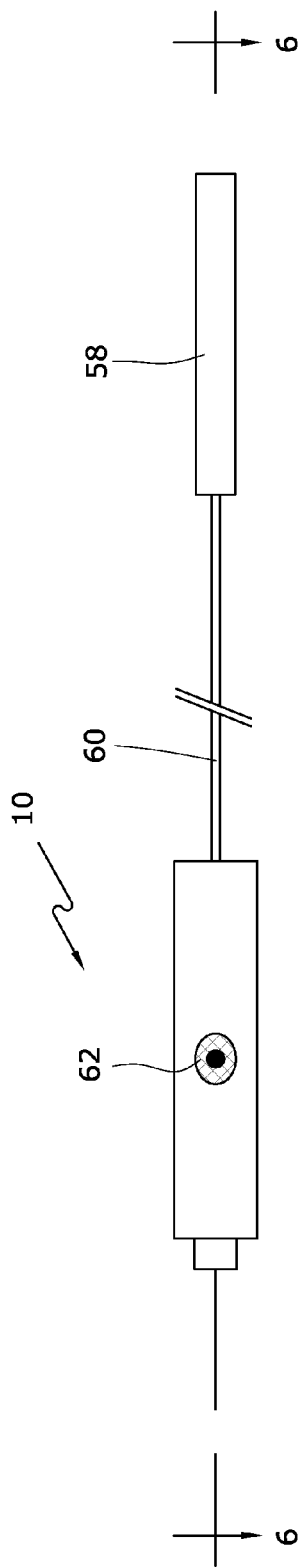
FIG. 5 is a front view of another embodiment of the present invention.
Figure 6:
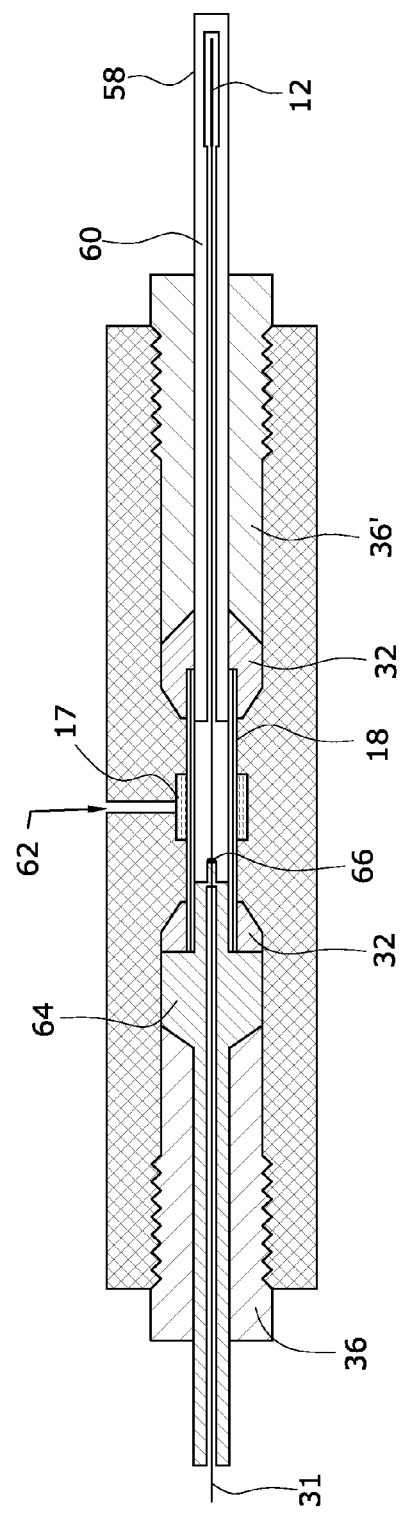
FIG. 6 is a cross-sectional view of FIG. 5.

In accordance with another embodiment of the present invention, sensor 12 is located remote from isolation housing 10, as shown in FIGS. 5 and 6. In this embodiment, sensor 12, which is protected by sleeve 58, is located downstream from isolation housing 10, and is connected thereto by hollow tube 60. One of the advantages for moving sensor 12 out from isolation housing 10 is to reduce the response time for temperature measurements. In the embodiment illustrated in FIG. 1, the heat from the well fluid has to conduct through isolation housing 10 before reaching sensor 12. By placing sensor 12 away from the relatively thick walls of isolation housing 10, the temperature of the well fluid can be sensed quicker. Sensor 12 can be located downstream of isolation housing 10, or alternatively can be positioned upstream from isolation housing 10. Additionally, when sensor 12 and isolation housing 10 are inserted into a string of multiple sensors or tools, sensor 12 may hang off of housing 10 (or vice versa). Tube 60 is preferably flexible and can be made from annealed stainless steel or other durable, flexible materials.

Referring to FIG. 6, isolation housing 10 contains pressure port 62, which is in fluid communication with the well fluid. The well fluid directly applies pressure on sensor tube 18. Porous filter element 17 is optional in this embodiment. The pressure applied on sensor tube 18 is hydraulically transfer to clean fluid 26', which in this embodiment is stored within sensor tube 18, along the interior of hollow tube 60 and inside sleeve 58, which contains sensor 12. Hence, the pressure of the well fluid is directly, hydraulically transferred to sensor 12 via clean fluid 26'. Sleeve 58 is preferably thinner than isolation housing 10, which allows the temperature of well fluid to be measured quicker without having to wait for isolation housing 10 to come to thermal equilibrium with the well fluid, and sensor tube 18 and clean fluid 26' transfer the pressure of the well fluid to sensor 12 hydraulically to allow both pressure and temperature of the well fluid to be measured at the same time and same location.

Sensor tube 18 fits over hollow tube 60 at its distal end and over support 64 at its proximal end, as shown in FIG. 6. Sensor tube 18 is sealed and supported on both ends by sealing elements 32 and 32', similar to the sealing element 32 described above. Sealing elements 32 and 32' are compressed to ensure a seal by threaded compression plugs 36 and 36', respectively. Optical fiber 28 with protective outer covering 31 passes through support 64, and when optical fiber 28 passes beyond support 64 and into sensor tube 28 outer covering 31 is preferably stripped. Optical fiber 28 then passes through sensor tube 28, hollow tube 60 and into sleeve 58 to connect optically to sensor 12. In one embodiment, support 64 is made from metal and a glass-metal seal 66 is provided between optical fiber 28 and support 64.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

The invention claimed is:

1. A sensor housing comprising:
   a flexible sensor tube containing a transmission fluid and having sealed ends, and an optical sensor connected to an optical fiber, wherein the optical sensor is adapted to measure a pressure of a fluid and said pressure is communicated to the flexible sensor tube so that said pressure is transferred by the transmission fluid to the optical sensor, wherein the flexible sensor tube is at least partially surrounded by a porous, permeable element and said pressure is communicated through the porous, permeable element to act on the flexible sensor tube.

2. The sensor housing of claim 1, wherein the optical sensor also measures temperature.

3. The sensor housing of claim 1, wherein said pressure is communicated to the flexible sensor tube through a pressure port.

4. The sensor housing of claim 1, wherein the porous, permeable element contains a fluid.

5. The sensor housing of claim 1, wherein the porous, permeable element is partially enclosed in an outer tube with at least a portion of the porous, permeable element exposed to the fluid to be measured.

6. The sensor housing of claim 1, wherein the optical sensor is located within the flexible sensor tube.

7. The sensor housing of claim 1, wherein the sensor comprises an EFPI pressure sensor.

8. The sensor housing of claim 1, wherein the sensor comprises an IFPI pressure sensor.

9. The sensor housing of claim 1, wherein a surface of the flexible sensor tube is coated with a metal.

10. The sensor housing of claim 1, wherein the sensor comprises a Bragg sensor embedded in a wall of the sensor tube.

11. The sensor housing of claim 1, wherein the optical fiber is connected at the other end to an instrumentation unit.

12. The sensor housing of claim 1, wherein the fluid to be measured comprises the fluids in a wellbore.

13. A sensor housing comprising:
a flexible sensor tube containing a transmission fluid and having sealed ends, and an optical sensor connected to an optical fiber, wherein the optical sensor is adapted to measure a pressure of a fluid and said pressure is communicated to the flexible sensor tube so that said pressure is transferred by the transmission fluid to the optical sensor, wherein the optical sensor is located remote from the flexible sensor tube.

14. The sensor housing of claim 13, wherein the optical sensor is protected by a sleeve.

15. The sensor housing of claim 14, wherein the sleeve is connected to the flexible sensor tube and is in fluid communication therewith.

16. The sensor housing of claim 15, wherein the sleeve is connected to the flexible sensor by a hollow tube.

17. The sensor housing of claim 15, wherein the sleeve also contains the transmission fluid.

18. The sensor housing of claim 16, wherein the hollow tube also contains the transmission fluid.

19. A sensor housing comprising:
a flexible sensor tube containing a transmission fluid and having sealed ends, and an optical sensor connected to an optical fiber, wherein the optical sensor is adapted to measure a pressure of a fluid and said pressure is communicated to the flexible sensor tube so that said pressure is transferred by the transmission fluid to the optical sensor, wherein a surface of the flexible sensor tube is coated with a metal.

* * * * *